United States Patent [19]
Consiglio et al.

[11] Patent Number: 5,459,783
[45] Date of Patent: Oct. 17, 1995

[54] ACOUSTIC FEEDBACK SUPPRESSION DEVICE PARTICULARY FOR AUXILIARY RINGERS IN PLUG-IN TELEPHONE SYSTEMS

[75] Inventors: Pietro Consiglio, Milan; Carlo Antonini, Venegono Inferiore, both of Italy

[73] Assignee: SGS-Thompson Microelectronics S.A., Saint-Genis, France

[21] Appl. No.: 17,790

[22] Filed: Feb. 16, 1993

[30] Foreign Application Priority Data

Feb. 17, 1992 [IT] Italy .................................. MI92A0336

[51] Int. Cl.⁶ ..................................................... H02H 9/00
[52] U.S. Cl. ......................... 379/373; 379/372; 379/375; 379/387; 361/119
[58] Field of Search ..................................... 379/373, 373, 379/375, 412, 406, 416, 331, 387, 392; 361/119, 120, 91, 111, 126

[56] References Cited

U.S. PATENT DOCUMENTS

| | | |
|---|---|---|
| 4,107,476 | 8/1978 | Henderson . |
| 4,152,549 | 5/1979 | Ceruti et al. . |
| 4,213,012 | 7/1980 | Caroll et al. . |
| 4,941,063 | 7/1990 | McCartney et al. ................. 379/412 X |
| 4,991,051 | 2/1991 | Hung ................................... 379/412 X |

FOREIGN PATENT DOCUMENTS 2539415  3/1977  Germany ............................... 373/373

Primary Examiner—James L. Dwyer
Assistant Examiner—Magdy W. Shehata
Attorney, Agent, or Firm—Greenfield & Sacks Wolf

[57] ABSTRACT

An acoustic feedback suppression device, particularly for auxiliary ringers in plug-in telephone systems, includes diodes in addition to a rectifier bridge of the ringer. The circuit provides direct-current decoupling and limits the AC voltage present across the auxiliary ringer.

19 Claims, 2 Drawing Sheets

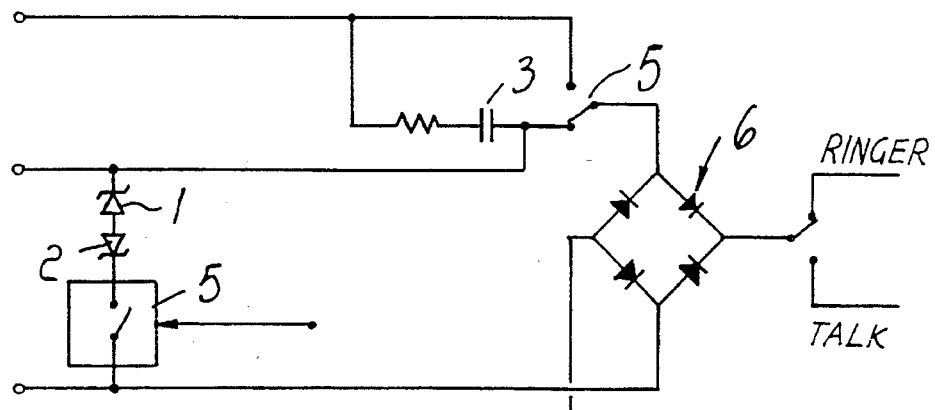
PRIOR ART Fig. 2
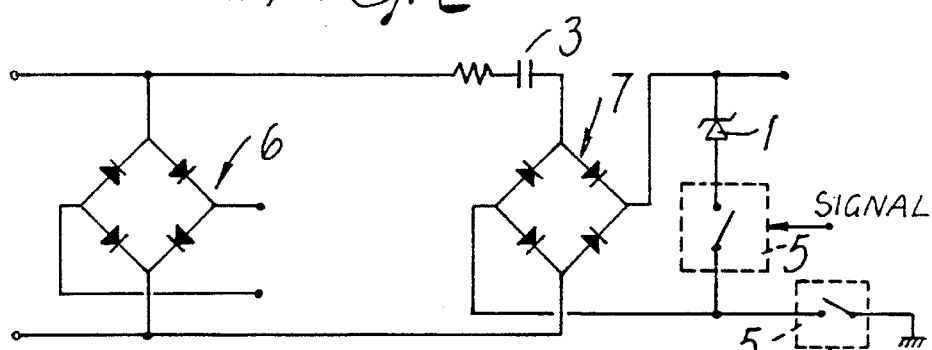
PRIOR ART Fig. 3
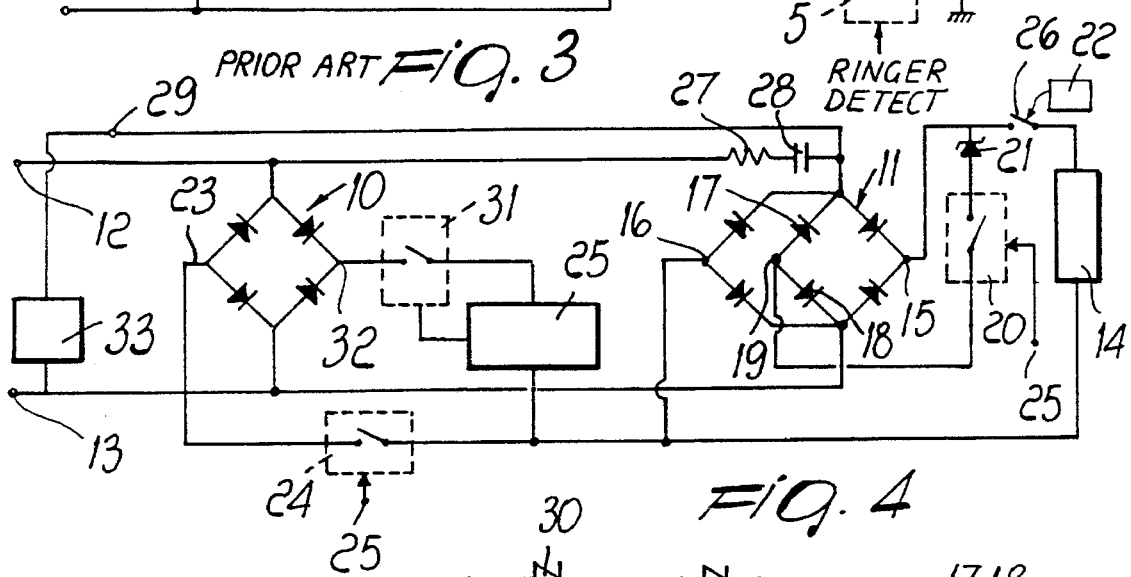
Fig. 4
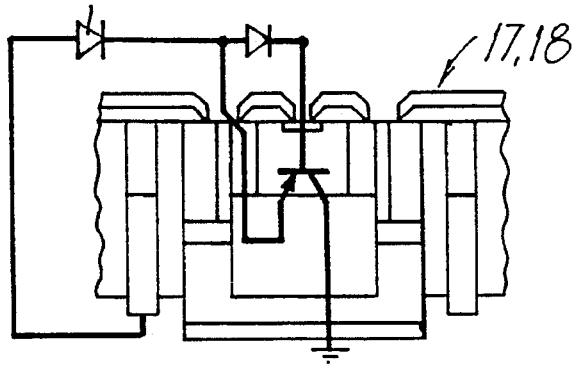
Fig. 5

ACOUSTIC FEEDBACK SUPPRESSION DEVICE PARTICULARY FOR AUXILIARY RINGERS IN PLUG-IN TELEPHONE SYSTEMS

BACKGROUND OF THE INVENTION

1. Field of the Invention

The present invention relates to an acoustic feedback suppression device particularly for auxiliary ringers in plug-in telephone systems.

2. Discussion of the Related Art

As is known, an additional electromechanical ringer is usually present in plug-in telephone systems. This ringer is always connected to the telephone line even when no telephone sets are connected to the sockets, thereby allowing for detection of any incoming calls and connection of a telephone set.

Unfortunately, the presence of the additional ringer introduces an unpleasant acoustic feedback when a telephone number is dialed with a pulse-dial selector while a telephone set is connected to the line.

With the pulse-dial signaling, the line is in fact suddenly interrupted a number of times corresponding to each individual selected digit. The interruption frequency is normally equal to 10 Hz, with an open/close ratio of 1.5 to 2.0.

Additionally, due to exchange inductance, voltage pulses of random amplitude (overvoltages) occur during the repeated opening of the telephone line. These voltage pulses are the pulses which can consequently activate the additional ringer in a spurious manner, causing the above-mentioned unwanted acoustic feedback.

In order to eliminate this type of problem, it is necessary to limit the voltage across the additional ringer. This limiting action must be performed in AC during pulse-dialling, whereas the limiting circuit must be decoupled from the telephone line when connection to the line occurs in the on-hook condition or during ringing.

Some known solutions are discussed below. A first solution provides for the insertion, by means of an appropriate switch, of a voltage limiter, as more clearly described hereinafter, constituted by a pair of Zener diodes connected back to back, of a DC decoupling capacitor and of an insertion switch.

In the case of an electronic insertion switch there is also the problem that the telephone line does not have a set polarity, and it is thus necessary to overcome this problem as well. A solution to this further problem is given by the insertion of an additional bridge which simplifies the execution of the electronic switch.

The above described solutions are particularly complicated to implement on a single silicon substrate.

The aim of the present invention is to eliminate or substantially reduce the problems described above by providing an acoustic feedback suppression device, particularly for auxiliary ringers in plug-in telephone systems, which allows for the elimination or substantial suppression of the acoustic feedback of the additional ringer during pulse-dialing.

Within the scope of the above aim an object of the present invention is to provide a suppression device which controls the voltage across the additional ringer, limiting any spurious activation pulses.

Another object of the present invention is to provide an acoustic feedback suppression device which is highly reliable, relatively easy to manufacture and at competitive costs with respect to mechanical switches.

SUMMARY OF THE INVENTION

This aim, the objects mentioned and others which will become apparent hereinafter are achieved by an acoustic feedback suppression device, particularly for auxiliary ringers in plug-in telephone systems, including first and second input telephone lines. First and second rectifier bridges are coupled across the first and second input telephone lines. An auxiliary ringer and a telephone ringer are coupled across the first and second input telephone lines. First and second diodes are coupled to the first and second input telephone lines, to the second rectifier bridge and to the telephone ringer, power being supplied to the telephone ringer through the first and second diodes.

BRIEF DESCRIPTION OF THE DRAWINGS

Further characteristics and advantages of the invention will become apparent from the description of a preferred but not exclusive embodiment of an acoustic feedback suppression device, particularly for auxiliary ringers in plug-in telephone systems, according to the invention, illustrated only by way of a non-limiting example in the accompanying drawings, wherein:

FIG. 2 is an electrical schematic diagram of a second prior art circuit;

FIG. 3 is an electrical schematic diagram of a third prior art circuit;

FIG. 4 is an electrical schematic diagram of a suppression device circuit according to the present invention; and FIG. 5 is a sectional elevation view of one of the diodes of the circuit of FIG. 4.

DETAILED DESCRIPTION

Figure 1:
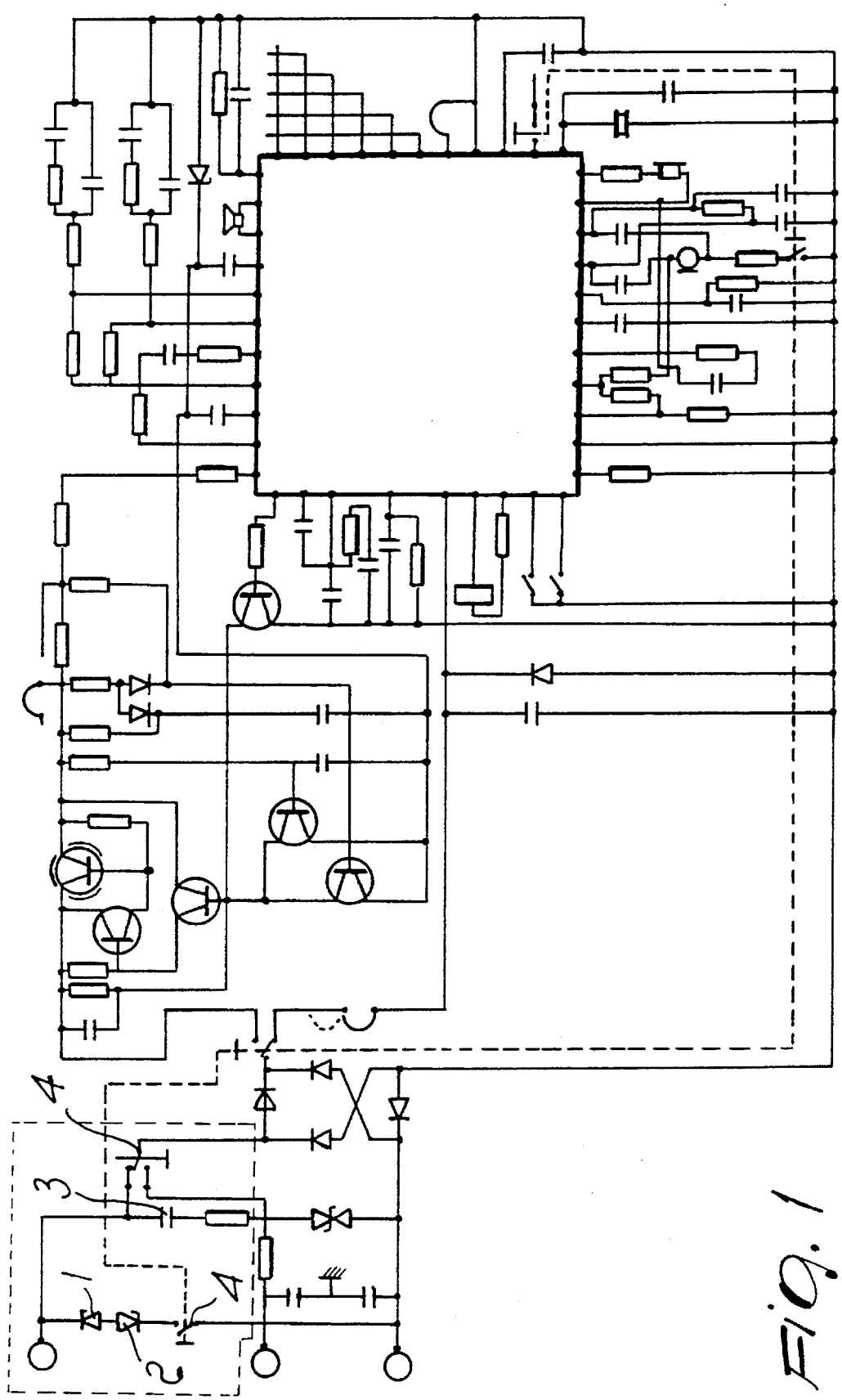
FIG. 1 is an electrical schematic diagram of a first prior art circuit.

With reference to FIGS. 1 to 3, these figures illustrate prior art solutions, as previously mentioned. In the prior art embodiment of FIG. 1, it can be seen that an attempt is made to eliminate acoustic feedback on the auxiliary ringer by using a pair of Zener diodes 1 and 2 which are mutually connected by means of their respective anode terminals, and the direct-current decoupling of the ringer is provided by a capacitor 3 and mechanical switches 4.

Another known solution is the one illustrated in the prior art embodiment of FIG. 2, which includes a pair of Zener diodes 1 and 2 (numbering in the prior art embodiments is maintained consistent for like elements for the sake of simplicity in description) and a capacitor 3, whereas the mechanical switches of the embodiment of FIG. 1 are replaced with electronic switches 5. A rectifier bridge 6 is furthermore provided in order to supply power to the ringer. A severe problem of this solution is related to the polarity imposed by the telephone line. The polarity of the line is in fact not definite, and thus the problem relates to the biasing of the electronic switch, which generally comprises a bipolar transistor or a MOSFET transistor.

Another known solution, shown in the prior art embodiment of FIG. 3, includes a single Zener diode 1 and uses a double rectifier bridge arrangement 6 and 7. A capacitor 3 is present for direct-current decoupling, and the switches 5 are preferably electronic. The execution of the switches 5 is simplified, since the polarity is ensured by the bridge 7.

With reference to FIG. 4, an acoustic feedback suppression device particularly for auxiliary ringers in plug-in telephone systems according to the present invention is shown. A first rectifier bridge and a second rectifier bridge, respectively designated by the reference numerals 10 and 11, are located between input terminals 12 and 13 of a telephone line. An auxiliary ringer 33 is powered through a first terminal 29 and a second terminal 13.

The cathode terminals of the diodes 17 and 18 are connected to the ends of the first diagonal of the second rectifier bridge 11. Means are provided for connecting the first rectifier bridge 10 and the second rectifier bridge 11 and for connecting the second rectifier bridge 11 and the ringer 14. The diodes 17 and 18 are preferably of the low-leakage type.

The second rectifier bridge 11 has a first terminal 15 connected to a node 19 defined between the diodes 17 and 18 through a first switch 20 and a Zener diode 21. The first switch 20 is controlled by a talk circuit 25 which closes the first switch 20 if the handset is unhooked, inserting an additional voltage limiter between the terminals 29 and 13 of the ringer.

A first terminal 23 of the first rectifier 10, preferably constituted by a diode bridge, can be connected, by means of a second switch 24, to the node 16 and a second terminal 32 can be connected to a talk circuit 25 by means of a third switch 31.

The first switch 20, the second switch 24 and the third switch 31 are controlled by the unhooking of the handset and by the talk circuit 25, and constitute the connection means.

A fourth switch 26, which is controlled by a call detector 22, is interposed between the first terminal 15 of the second bridge 11 and the ringer 14.

A resistor 27 and a capacitor 28 are arranged along a branch which connects the input terminal 12 to the first diagonal of the rectifier bridge 11. The capacitor 28 acts as direct-current decoupler for the ringer 14 with respect to the telephone line.

The diodes 17 and 18 are of the type shown in FIG. 5, those being LLDs (low leakage diodes). In the device according to the invention, which can be either produced with discrete components or integrated on a single substrate, each one of the diodes 17 and 18 has an associated parasitic diode 30 which has a PN junction. In the above described embodiment, the P side of the junction is the substrate itself, whereas the N side is the node 19 (shown in FIG. 4). With these characteristics, if a DC voltage is applied to the terminals 12 and 13, the voltage of the node 19 coincides with the voltage of the substrate in the on-hook condition, i.e. in the condition of a telephone which has its handset hooked, with no call in progress.

During reception, i.e. when a call is arriving, the presence of the diodes 17 and 18 does not interfere with the operation of he circuit, since the first switch 20, the second switch 24 and the third switch 31 are open while the fourth switch 26 is closed.

During a call, i.e. with the handset unhooked, the first switch 20, the second switch 24 and the third switch 31 are closed, the fourth switch 26 is open, and a voltage set by the talk circuit 25, except for particular cases provided for by national statutory provisions, is established on the terminals 12 and 13.

During a call, terminals 29 and 13 of the power supply of the additional ringer are AC-limited by the presence of the Zener diode 21.

Advantageously, the voltage of the node 19 follows the voltage of the substrate (node 16) on which the device according to the invention is provided, when the voltage of the terminal 12 is positive with respect to the terminal 13, whereas the voltage of node 19 is positive with respect to the substrate (node 16) when the voltage of the terminal 13 is positive with respect to the voltage of the terminal 12. In the latter case, the described condition does not constitute a problem for the integrated diodes 17 and 18, since the parasitic diodes 30 are reverse-biased.

It is thus possible to use both integrated and discrete diodes 17 and 18 in the circuit of the present invention including the insertion of the Zener diode 21 through a switch 20, for the purpose of limiting the AC voltage across the additional ringer.

Conveniently, the present invention is useful in the case of the production of talk circuits and ringer circuits on a single substrate, i.e., so-called "monochip solutions".

Practical tests have shown that the present invention achieves the intended aim and objects, constituting a suppression device which can limit, by means of the Zener diode 21, the AC voltage across the auxiliary ringer, while simultaneously eliminating the possibility of acoustic feedbacks.

The invention is susceptible to numerous modifications and variations, all of which are within the scope of the inventive concept. All the details may furthermore be replaced with other technically equivalent elements.

In practice, the materials employed, as well as the dimensions, may be any according to the requirements.

Having thus described one particular embodiment of the invention, various alterations, modifications, and improvements will readily occur to those skilled in the art. Such alterations, modifications, and improvements as are made obvious by this disclosure though not expressly stated herein, are intended to be within the spirit and scope of the invention. Accordingly, the foregoing description is by way of example only and is not intended as limiting. The invention is limited only as defined in the following claims and the equivalents thereto.

What is claimed is:

1. An acoustic feedback suppression device for telephone systems with auxiliary ringers comprising:

first and second input telephone lines;

first and second rectifier bridges coupled across said first and second input telephone lines;

an auxiliary ringer coupled across said first and second input telephone lines;

a telephone ringer coupled across said first and second input telephone lines, power being provided to said telephone ringer through said second rectifier bridge;

first and second diodes coupled to said first and second input telephone lines, to said second rectifier bridge, and to said auxiliary ringer;

a first switch, a second and a third switch;

a zener diode, wherein said second rectifier bridge includes a first terminal and a second terminal, and wherein said first and second diodes include a common node, said first terminal of said second rectifier bridge being connected to said common node of said first and second diodes through said first switch and said zener diode; and a talk circuit, wherein said first rectifier bridge includes a first terminal and a second terminal, said first terminal of said first rectifier bridge being connected to said talk circuit through said second switch, and said second terminal of said first rectifier bridge being connected to said talk circuit through said third switch;

wherein the first, second and third switches are connected to and controlled by the talk circuit such that all of the switches are closed in an off-hook condition of the telephone system so that the zener diode is directly connected between the first terminal of the second rectifier bridge and the common node of the first and second diodes so that ac voltage across the auxiliary ringer is limited.

2. A device as claimed in claim 1 further including a telephone attached to the telephone ringer, wherein the first, second and third switches are controlled by different operating states of the telephone and by the talk circuit.

3. A device as claimed in claim 2 wherein the first, second and third switches switch states when the telephone changes to an unhooked operating state.

4. A device as claimed in claim 1 further including:

a fourth switch; and a call detector;

wherein the fourth switch is connected between the first terminal of the second rectifier bridge and the telephone ringer, and the call detector is coupled to and controls the fourth switch.

5. A device as claimed in claim 3 further including:

a fourth switch; and a call detector;

wherein the fourth switch is connected between the first terminal of the second rectifier bridge and the telephone ringer, and the call detector is coupled to and controls the fourth switch.

6. A device as claimed in any one of claims 1, 2–5 wherein the first and second diodes include monolithic integrated low leakage diodes.

7. An acoustic feedback suppression device for controlling operation of auxiliary ringers coupled to telephone systems, comprising:

first and second input telephone lines;

first and second means for rectifying coupled across the first and second input telephone lines;

means for ringing coupled across the first and second input telephone lines;

first and second diodes coupled to the first and second input lines, to the second means for rectifying, and to the means for ringing;

a first means for switching means for limiting alternating current, wherein the second means for rectifying includes a first terminal and a second terminal, and wherein the first and second diodes include a common node, the first terminal of the second means for rectifying being connected to the common node through the first means for switching and the means for limiting alternating current second and third means for switching; and means for setting a voltage, wherein the first means for rectifying includes a first terminal and a second terminal, the first terminal of the first means for rectifying being connected to the means for setting a voltage through the second means for switching, and the second terminal of the first means for rectifying being connected to the means for setting a voltage through the third means for switching;

wherein the first, second and third means for switching are connected to and controlled by the means for setting a voltage such that all of the first, second and third means for switching are closed in an off-hook condition of the telephone system so that the means for limiting alternating current is directly connected between the first terminal of the second means for rectifying and the common node of the first and second diodes such that alternating current voltage across an auxiliary ringer is limited.

8. An acoustic feedback suppression device for telephone systems with auxiliary ringers as claimed in claim 7 further including a telephone connected to the means for ringing, wherein the first, second and third means for switching are controlled by conditions of the telephone and by the means for setting a voltage.

9. An acoustic feedback suppression device for telephone systems with auxiliary ringers as claimed in claim 8 wherein the first, second and third means for switching switch state when the telephone changes to an unhooked condition.

10. An acoustic feedback suppression device for telephone systems with auxiliary ringers as claimed in claim 7 further including:

a fourth means for switching; and means for detecting a phone call;

wherein the fourth means for switching is connected between the first terminal of the second means for rectifying and the means for ringing, and the means for detecting a phone call is coupled to and controls the fourth means for switching.

11. An acoustic feedback suppression device for telephone systems with auxiliary ringers as claimed in claim 9 further including:

a fourth means for switching; and means for detecting a phone call;

wherein the fourth means for switching is connected between the first terminal of the second means for rectifying and the means for ringing, and the means for detecting a phone call is coupled to and controls the fourth means for switching.

12. An acoustic feedback suppression device comprising:

first and second input telephone lines first and second rectifier bridges coupled across the first and second input telephone lines first and second diodes coupled to the first and second input lines, and to the first and second rectifier bridges;

a first switch;

a zener diode, wherein the second rectifier bridge includes a first terminal and a second terminal, and wherein the first and second diodes include a common node, the first terminal of the second rectifier bridge being connected to the common node of the first and second diodes through the first switch and zener diode;

second and third switches; and a talk circuit, wherein the first rectifier bridge includes a first terminal and a second terminal, the first terminal of the first rectifier bridge being connected to the talk circuit through the second switch, and the second terminal of the first rectifier bridge being connected to the talk circuit through the third switch;

wherein the first, second and third switches are connected to and controlled by the talk circuit such that all of the switches are closed in an off-hook condition of the telephone system so that the zener diode is directly connected between the first terminal of the second rectifier bridge and the common node of the first and second diodes so that ac voltage across the first and second input telephone lines is limited.

13. An acoustic feedback suppression device as claimed in claim 12 further including a telephone coupled across the first and second input telephone lines, wherein the first, second and third switches are controlled by conditions of the telephone and by the talk circuit.

14. An acoustic feedback suppression device as claimed in claim 13 wherein the first, second and third switches switch state when the telephone changes to an unhooked condition.

15. An acoustic feedback suppression device as claimed in claim 13 further including:
    a fourth switch; and
    a call detector;
    wherein the fourth switch is connected between the first terminal of the second rectifier bridge and the telephone, and the call detector is coupled to and controls the fourth switch.

16. An acoustic feedback suppression device as claimed in claim 14 further including:
    a fourth switch; and
    a call detector;
    wherein the fourth switch is connected between the first terminal of the second rectifier bridge and the telephone, and the call detector is coupled to and controls the fourth switch.

17. A device as claimed in any one of claims 12, 13–16 wherein the first and second diodes include low leakage diodes integrated monolithically.

18. An acoustic feedback suppression device for telephone systems with auxiliary ringers comprising:
    first and second input telephone lines;
    first and second rectifier bridges coupled across said first and second input telephone lines;
    an auxiliary ringer coupled across said first and second input telephone lines;
    a telephone ringer coupled across said first and second input telephone lines, power being provided to said telephone ringer through said second rectifier bridge;
    first and second diodes coupled to said first and second input telephone lines, to said second rectifier bridge, and to the telephone ringer, wherein a common node between the first and second diodes is connected through a first switch and a zener diode to a terminal of the second rectifier bridge; and
    a talk circuit, coupled to first and second terminals of the first rectifier bridge and to the first switch, the talk circuit for controlling operation of the first switch such that the first switch is closed during an off-hook condition of the telephone system.

19. An acoustic feedback suppression device comprising:
    first and second input telephone lines;
    first and second rectifier bridges coupled across the first and second input telephone lines;
    first and second diodes coupled to the first and second input lines, and to the first and second rectifier bridges, wherein a common node between the first and second diodes is connected through a first switch and a zener diode to a terminal of the second rectifier bridge; and
    a talk circuit coupled to first and second terminal of the first rectifier bridge and to the first switch, the talk circuit for controlling operation of the first switch such that the first switch is closed during an off-hook condition of the telephone system.

* * * * *

UNITED STATES PATENT AND TRADEMARK OFFICE
CERTIFICATE OF CORRECTION

PATENT NO. : 5,459,783
DATED : October 17, 1995
INVENTOR(S) : Pietro CONSIGLIO and Carlo ANTONINI It is certified that error appears in the above-indentified patent and that said Letters Patent is hereby corrected as shown below:

On the title page, the assignee should read as follows:

[73] Assignee: SGS-Thomson Microelectronics S.r.l., Agrate Brianza, Italy

Signed and Sealed this

Eleventh Day of June, 1996

Attest:

BRUCE LEHMAN

Attesting Officer

Commissioner of Patents and Trademarks